(12) United States Patent
Zhang et al.

(10) Patent No.: US 7,571,059 B2
(45) Date of Patent: Aug. 4, 2009

(54) MECHANISM FOR DETERMINING AN ACCELERATED TEST SPECIFICATION FOR DEVICE ELEMENTS

(75) Inventors: Ron Zhang, Sunnyvale, CA (US); Bidyut Sen, Milpitas, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 415 days.

(21) Appl. No.: 11/477,235

(22) Filed: Jun. 28, 2006

(65) Prior Publication Data

US 2008/0004826 A1    Jan. 3, 2008

(51) Int. Cl.
*G01B 3/44* (2006.01)
(52) U.S. Cl. .......................................... 702/34
(58) Field of Classification Search .............. 702/34, 702/35, 42, 56–58, 118–120, 179, 182, 185, 702/193; 703/14, 18, 20; 134/1
See application file for complete search history.

(56) References Cited

U.S. PATENT DOCUMENTS

| | | | |
|---|---|---|---|
| 6,678,627 B1 * | 1/2004 | Starr | 702/119 |
| 7,283,932 B2 * | 10/2007 | Olsson | 702/182 |
| 2006/0260639 A1 * | 11/2006 | Fani et al. | 134/1 |

* cited by examiner

*Primary Examiner*—Edward Raymond
*Assistant Examiner*—Mohamed Charioui
(74) *Attorney, Agent, or Firm*—Osha • Liang LLP (57) ABSTRACT

A mechanism is disclosed for determining an accelerated test for a device. The method comprises calculating an estimated amount of damage that an element of the device would suffer if the device were operated under a set of specified conditions over a certain period of time (e.g., expected lifetime of the device). The method further comprises determining an accelerated test to which to subject the element in order to cause the element to suffer an actual amount of damage that is approximately equal to the estimated amount of damage. The accelerated test may be an accelerated test cycle, such as an accelerated temperature cycle.

18 Claims, 5 Drawing Sheets

MECHANISM FOR DETERMINING AN ACCELERATED TEST SPECIFICATION FOR DEVICE ELEMENTS

BACKGROUND

Stress from use and/or environmental factors cause cumulative damage to elements of devices. For example, solder joints of an electronic device suffer cumulative damage due to use and environmental conditions. The cumulative damage is often referred to as fatigue. The environmental conditions include many factors such as temperature, humidity, air pressure, etc. For example, temperature changes cause stress to solder due to differences in expansion rates of the solder and the material to which the solder is affixed. The manner in which a device is used significantly affects the rate of damage to the elements. For example, an electronic device that is used constantly will suffer damage at a different rate than one that is used infrequently. During the lifetime of the device, the cumulative effect of the damage can cause a failure of one or more elements, such as a solder joint failing.

Accelerated stress testing is a way to simulate, in a very compressed period, the cumulative effect of the stress that elements of the device would suffer over a longer period of time. The stresses that the elements would experience over its lifetime are accelerated by applying high levels of stimuli over a short time period. High levels of stimuli include temperature cycling, thermal shock, and vibration. For example, the device may be subjected to thousands of stress cycles over a short period of time. As a particular example, a widely used accelerated stress test is the accelerated temperature cycle (ATC) test. One way to perform an ATC is to place a device or printed circuit assembly inside a chamber and cycle the temperature between two extremes. Failure mechanisms such as fatigue, corrosion, and metallic growth caused by migration of ions can be simulated by accelerated stress testing. Accelerated stress testing allows the fatigue suffered by an element of a device over a long period of time to be simulated in a relatively short time.

A drawback with accelerated stress testing is that it is very difficult to know how to construct the accelerated stress test. For example, it is difficult to determine an appropriate number of stress cycles to which a particular device should be subjected. There are generic standards that define how many accelerated test cycles are required to test a very broad class of devices. Typically, the generic test standards err on the side of being too rigorous.

A drawback of generic standards for accelerated tests is that if the standard is too rigorous, the device needs to be over-designed to pass the test. Over-designing may lead to added cost, added complexity, and longer product development times. Another drawback of generic standards is that if the standard is too lenient, the device will not be adequately tested.

Moreover, generic standards do not factor in the particular design of the device. Further, generic standards do not factor in how the device is actually going to be operated in the field. Thus, the generic accelerated stress tests may actually subject the device to far more or far less damage than the particular device would receive over its lifetime in its particular environment and use.

Because of these and potentially other drawbacks, this approach does not provide wholly satisfactory results. Consequently, an improved mechanism for testing the reliability of devices is needed.

SUMMARY

In accordance with one embodiment of the present invention, there is provided a method of determining a reliability test specification for a device. The method comprises calculating an estimated amount of damage that an element of the device would suffer if the device were operated under a set of specified conditions over a certain period of time (e.g., expected lifetime of the device). The method further comprises determining an accelerated test to which to subject the element in order to cause the element to suffer an actual amount of damage that is approximately equal to the estimated amount of damage.

In one embodiment, the accelerated test is an accelerated test cycle. The test cycles are temperature cycles, in one embodiment, but other test cycles can be used. The specified conditions may comprise conditions that the device would experience in field use. For example, if the device is a network server, then the field conditions could include the load on the server over time. The conditions can also include environmental factors, such as temperature and humidity.

In one embodiment, determining the accelerated test involves determining how many accelerated test cycles that the element should be subjected to in order to cause the element to suffer an amount of damage that is approximately equal to the estimated amount of damage due to operation of the device under the specified conditions.

Calculating the estimated amount of damage is performed by calculating a damage amount attributable to large damage-cycles and calculating one or more damage amounts attributable to small damage-cycles, in one embodiment. As an example, a large damage-cycle is related to the damage that a solder joint in an electronic device would suffer if the device were operated at some steady state power level for some time period. The steady state level is a peak power level, in one embodiment. The period of this large damage-cycle can be based on how long the device stays powered on between shutdowns.

In addition to damage due to the large damage-cycles, the element also suffers damage due small damage-cycles, in one embodiment. For example, due to the specified use of the device there may be a small cycle having a particular power characteristic over a period of, for example, 20 minutes. There may be many different small cycles having different periods and power characteristics. In the present example, the small damage-cycle is related to the damage that the solder joint would suffer due to the power deviating from the steady state power level.

Calculating the damage due to the large and small cycles is based on characteristics of the device, in one embodiment. For example, if the device has a motherboard with parts including a CPU, discrete circuit elements, a transformer, a heat sink, etc., then the position of the various parts and the power profile of at least some of the parts affect the damage to solder joints, as will be discussed further below.

Once the estimated amount of damage is determined, a determination is made of an accelerated test to which to subject the element in order to cause the element to suffer an actual amount of damage that is approximately equal to the estimated amount of damage. In one embodiment, this is done by determining a number of accelerated test cycles to which to subject the element in order to cause the element to suffer an actual amount of damage that is approximately equal to the estimated amount of damage.

Determining a number of accelerated test cycles is performed as follows, in one embodiment. An actual amount of damage that the element would suffer if subjected to a cycle of the accelerated test is determined. This is done by determining the amount of damage that the element will suffer each temperature cycle, in one embodiment. Using the example of the solder joint, the amount of damage that the solder joint suffers each temperature cycle is determined. This is based on a physical description of the solder joint, in one embodiment. For example, the size, shape, and material properties of the solder and components that it joins are considered.

Then, a determination is made as to how many accelerated test cycles will subject the element to the estimated amount of damage that the element would suffer if the device were operated under the specified conditions.

Notice that the accelerated test that is determined is based on factors such as the actual field use of the device, environmental conditions, and the particular design of the device. The accelerating test does not require the device to be over designed, while still fully qualifying the device for operating for specified conditions.

DETAILED DESCRIPTION OF EMBODIMENT(S)

Example Device to be Tested

Figure 1:
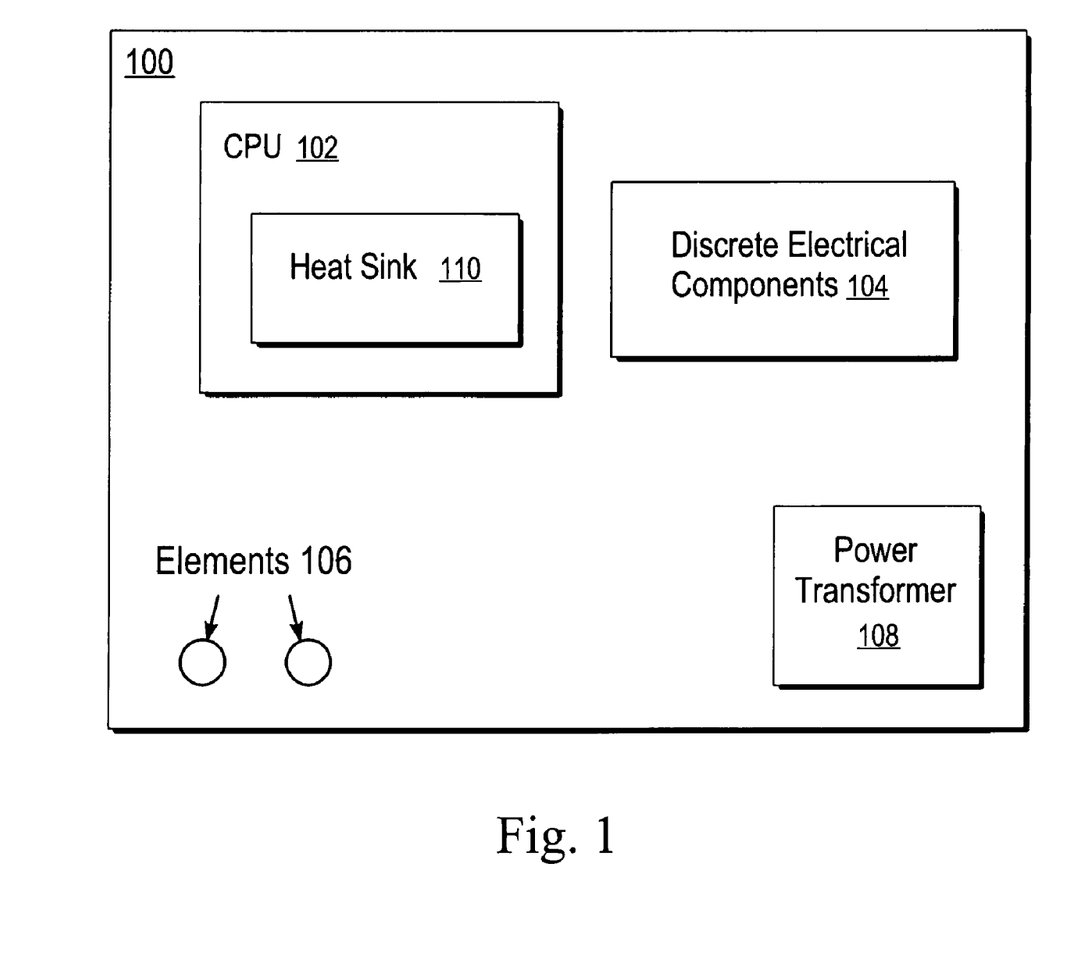
FIG. 1 is an example device that has a number of elements for which an accelerated test to qualify the elements for operation under specified conditions is determined, in accordance with an embodiment of the present invention.

FIG. 1 is an example device 100 that has a number of elements 106 for which an accelerated test to qualify the elements 106 for operation under specified conditions is determined, in accordance with an embodiment of the present invention. A number of accelerated test cycles to which the elements 106 should be subjected is determined, in one embodiment. As an example, the elements 106 may be solder joints. However, more generally, the element to be tested can be any element for which an estimate can be made of the lifetime damage to the element due to specified conditions, and for which an accelerated test that will cause approximately an equivalent amount of damage can be determined.

The accelerated test is a way to subject the elements to approximately an equivalent amount of damage that the elements 106 would suffer if they were subjected to the specified conditions for a certain time. The damage that the elements 106 suffer may be fatigue due to stress caused by the specified conditions. As used herein, the term "ETT (elements to test)" will be used to refer to elements 106 for which a suitable accelerated stress test is desired.

The device 100 also has a number of parts whose operation causes damage to the ETT 106. For example, the CPU 102, discrete electrical elements 104 (e.g., resistors), and power transformer 108 generate heat when the device 100 is powered on. The combined effect of the heat generated by all parts 102, 104, 108 causes damage to each of the ETTs 106. Thus, the heat generated by the various parts is of interest even if the particular part generating the heat is not being qualified by the accelerated stress test.

The amount of heat generated by these parts is derived from power profiles of various parts, in one embodiment. For example, the CPU, power transformer, and discrete electronic components each may have a power profile associated therewith. The power profile for each part models the power over the lifetime of the device 100, in one embodiment. The power profile for a particular part is broken down into two or more components to simplify the power profile, in one embodiment. For example, the power profile is de-composed into a large cycle (e.g., steady state) and one or more small cycle (e.g., transient) components. Example power profiles are discussed below.

In one embodiment, the heat generated by each part is combined to determine a temperature map, which describes the temperature at all points of interest in the device. If the power profile is broken into large and at least one small cycle component, a separate temperature map is determined for each component of the power profile. As a particular example, the temperature at each solder joint is determinable based on the temperature map corresponding to a particular power profile. The damage suffered by stress due to the temperature is determined, in one embodiment. A separate damage component is determined for each component (e.g., large cycle, small cycles) of the power profile.

Field data that are related to how the device is operated and the device's environmental conditions are collected, in one embodiment. The field data include temperature data, but are not limited thereto. As an example, the temperature of the CPU, various circuit elements, heat sink, and ambient temperature are measured. This data can be used to confirm the accuracy of the temperature data that is generated from the power data. At least some of the temperature data is used to determine a suitable accelerated test, in one embodiment. For example, data that describe the ambient temperature of the device are input to a processor that executes instructions to calculate a number of accelerated test cycles to which to subject the device.

The field data can also include electrical properties, such as voltage and current. These parameters can be collected at several places to help derive power profiles associated with different elements. For example, voltage and current can be measured to determine power consumption of the CPU, or either voltage or current can be measured to determine power consumption of a resistor. The power profiles are also determinable by device simulation.

Profiles

As previously discussed, based on the field use conditions, a model that describes one or more factors related to damage to one or more elements in the device is determined, in one embodiment. This model is broken into a large cycle component and one or more small cycle components, in one embodiment. As an example, the model comprises power profiles for an electronic device, in one embodiment. The power profiles relate to damage in that power is related to heat, which can damage elements such as solder joints.

Power profiles are suitable to represent a cause of damage to elements in electronic devices. However, the large and small cycle profiles could correspond to any factor that contributes to damage of an element. For example, if the element to be tested is an adhesive, a factor other than power (e.g., humidity) may be relevant to determining damage to the adhesive. In some cases, a factor such as vibration may be relevant to determining damage.

Large Cycles

Figure 2A:
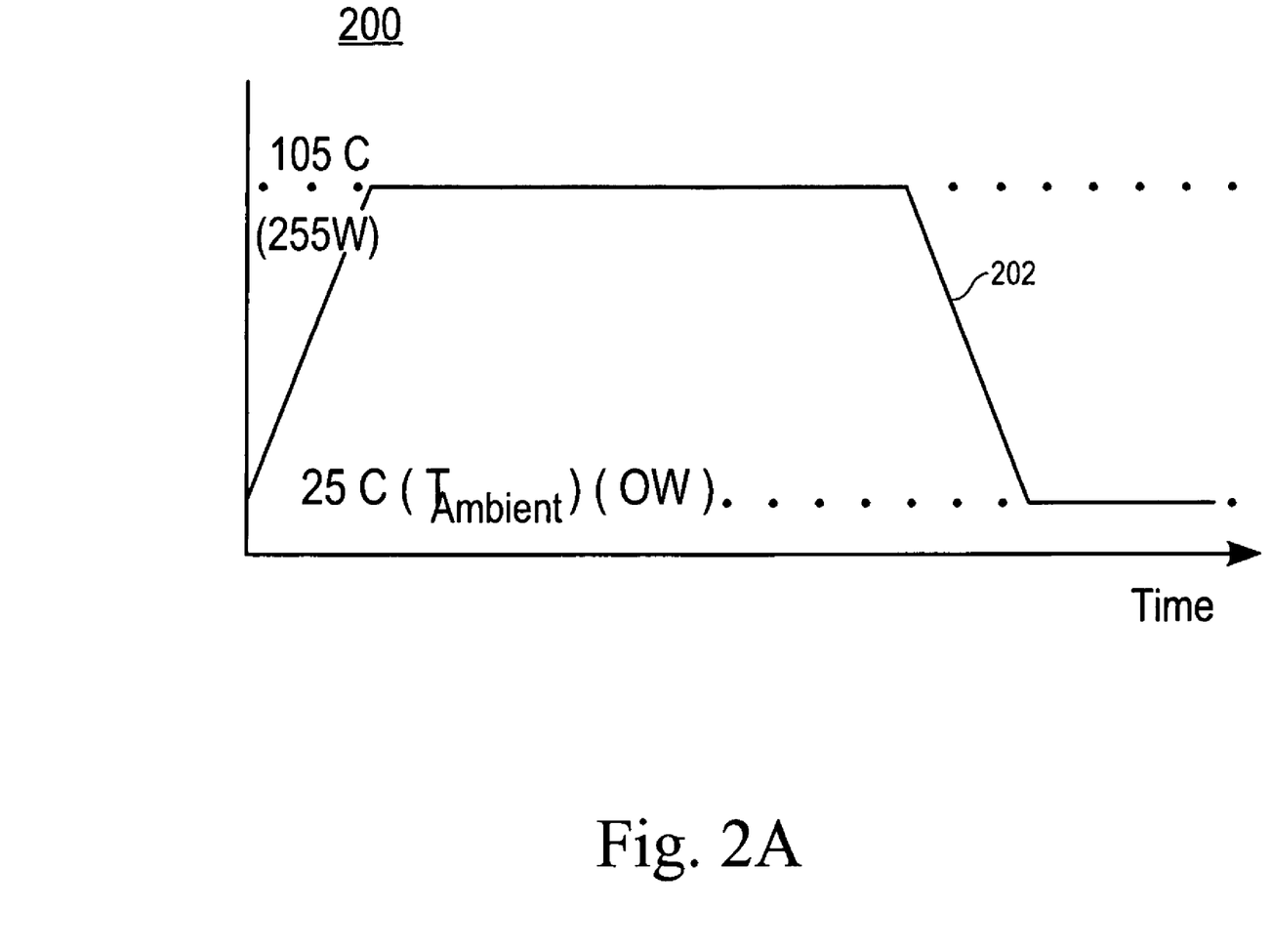
FIG. 2A depicts a graph have a curve representing a large cycle based on specified field use conditions, in accordance with an embodiment of the present inventions.

FIG. 2A depicts a graph 200 having a curve 202 representing a large cycle based on specified field use conditions, in accordance with an embodiment of the present inventions. The curve 202 represents one component of field use conditions. The low point of curve 202 corresponds to the device being off, in this embodiment. The peak of the large cycle corresponds to a peak power value, in this embodiment. However, the peak of the large cycle could correspond to some other value, such as a steady state value that is not a peak value.

Referring to FIG. 2A, shortly after being powered on, the curve 202 reaches the peak value and remains there until being powered off. The duration of the large cycle is based on expected field use conditions. For example, the device may be expected to remain on for about a week at a time and then powered down. In this example, the peak power is 255W, which corresponds to a temperature of 105 degrees Celsius for this device. The low value in this example is 0 Watts. The ambient temperature is 25 degrees Celsius. Either the power or temperature value may be used to determine the damage caused to the element due to this component of the large cycle. Thus, only one of temperature or power is needed.

As previously discussed, more than one part of a device may have a separate power profile associated therewith. Thus, the example large cycle power profile might correspond to a CPU. A separate power or temperature profile is determined for other parts, such as discrete electrical elements, power transformer, etc.

Power profiles can be generated based on a simulation of the device and on actual data. For example, based on a model of the device, a simulation program can output a power profile. Furthermore, data collected for an actual device in operation can be used to create, augment, or verify the profile.

Small Cycles

Figure 2B:
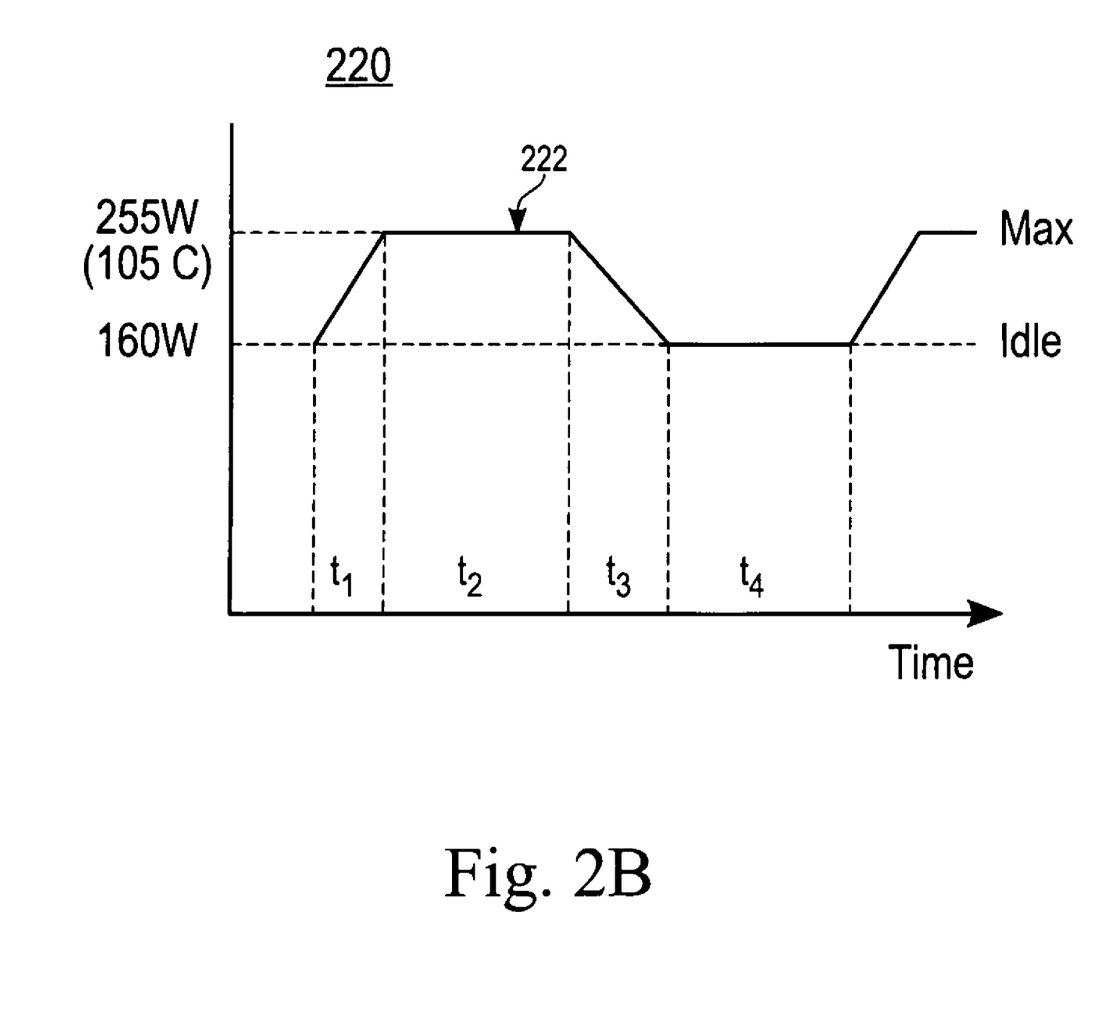
FIG. 2B is a graph having a curve of a small cycle based on specified field use conditions, in accordance with an embodiment of the present inventions.

FIG. 2B is a graph 220 having a curve 222 of a small cycle based on specified field use conditions, in accordance with an embodiment of the present inventions. In this example, small cycles are deviations from the large cycle, which is this example is a peak power component. In particular, the curve 222 shows a variation between idle power (160 W) and peak power (255 W). One or more small cycle curves might model the power component due to typical server loads. For example, a server might be expected to be used heavily at certain times each day and lightly at others. Thus, many different small cycles are possible.

The small cycle is modeled as having a dwell time (both high and low) of 10 minutes in this example. The small cycle further has ramp times (both up and down) of 0.02 minutes. The example small cycle is for illustrative purposes. More complex small cycles can be used. For example, the high dwell time can be different from the low dwell time and the ramp up time can be different from the ramp down time. The particular format of the curve is for convenience in representing the stress cause. The small cycle curve could have another format, such as a sinusoid, if that is convenient to describe the stress cause.

The dwell times and ramp times can be based on expected use or actually measured field use. For example, a simulation of the device can be run to determine values for the small cycle, in one embodiment. Parameters for the small cycle can also be determined based on specified use conditions, such as customer input. Table 1 depicts characteristics of the example small cycle profile. Table 1 indicates total cycles for seven years because that is the expected or desired lifetime of the device.

TABLE 1

| Dwell Time | 10 minutes |
| Ramp Times | 0.02 Minutes |
| Period | 20.03 Minutes |
| Cycles/Day | 72 |
| Cycles over 7 years | 182,151 |

Calculating Accelerated Test Cycles

As previously discussed, determining the accelerated test involves determining how many accelerated test cycles that the element should be subjected to in order to cause an approximately equal amount of damage as the damage caused by operating the device under the specified conditions over a certain time period. This is done by determining how much damage that the element would suffer due to specified field use conditions, and then determining how many accelerated test cycles are needed to produce an approximately equal amount of damage, in one embodiment.

Figure 3:
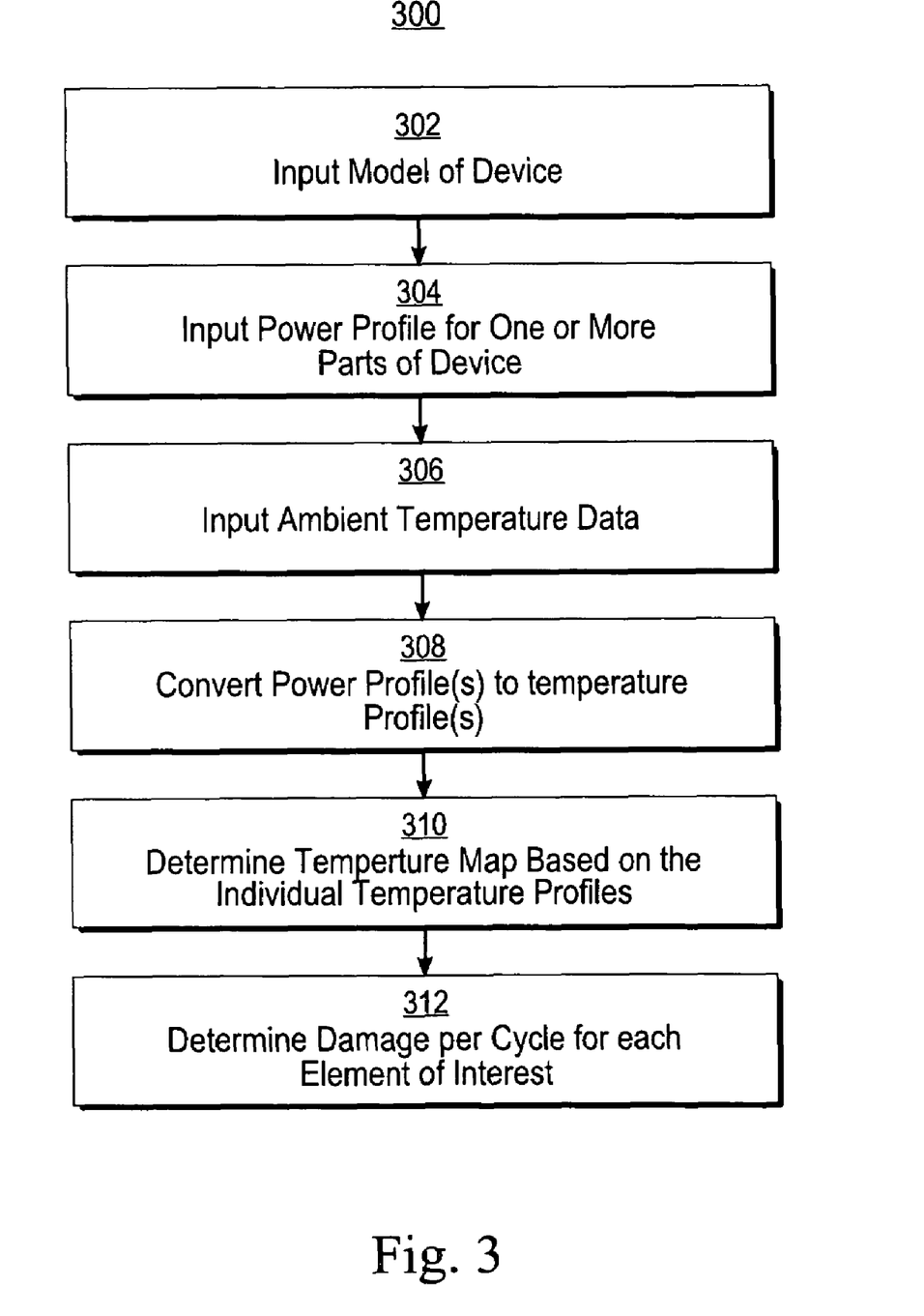
FIG. 3 is a flowchart illustrating steps of a process of generating a value for damage per cycle to an element of a device, in accordance with an embodiment of the present invention.

The following equation is used to determine the number of accelerated temperature cycles in order to produce an equivalent amount of damage to the device as it would receive due to operation under specified conditions for a certain period.

$$D_{large\_cycle} * N_{large\_cycle} + D_{small\_cycle} * N_{small\_cycle} = D_{accelerated\_cycle} * N_{accelerated\_cycle}$$ Eq. 1:

In equation 1, the terms on the left side are estimated damage that the device would suffer due to operation under specified conditions for a certain period. $D_{large\_cycle}$ is the damage due to each large cycle and $N_{large\_cycle}$ is the number of large cycles over the period of interest. The time period of interest may be the time for which the device is being qualified to remain reliable. $D_{small\_cycle}$ is the damage due to each small cycle and $N_{small\_cycle}$ is the number of small cycles over the period of interest. Equation 1 is for a case in which there is a single type of small cycle. As previously discussed, there can be many different types of small cycles. FIG. 3 describes a technique for determining the damage per cycle for each of the large cycles and small cycles, in accordance with one embodiment.

Referring to the right side of Equation 1, $D_{accelerated\_cycle}$ is the damage due to each of the accelerated test cycles and $N_{accelerated\_cycle}$ is the number of accelerated test cycles that are required to cause an equivalent amount of damage to the element as the estimated amount of damage that an element of the device would suffer if the device were operated under a set of specified conditions over a certain period of time.

Process Flow for Generating a Value for Damage to an Element Per Each Cycle

FIG. 3 is a flowchart illustrating steps of a process 300 of generating a value for damage to an element of a device per cycle, in accordance with an embodiment of the present invention. Damage to solder is used as an example; however, process 300 is not so limited. For example, a value for damage per cycle to an electronic part or an adhesive might be determined. Process 300 is performed for each type of cycle. For example, process 300 is performed to determine $D_{large\_cycle}$ and then repeated to determine $D_{small\_cycle}$. Process 300 pertains to all of the power cycles of a give type for the device. For example, process 300 determines a damage value related to the combined effects of the large power cycle for all elements (e.g., CPU, resistors, transformer, etc.) in the device.

In step 302, a model of the device is input. The model contains information to help generate a temperature map. The model describes a physical layout of the device and material properties of the device. For example, the model describes information such as the location, size, shape, and material properties of various elements. As a particular example, the model may describe the size, location, and material properties of various parts, such as CPU's, resistors, power transformers, heat sinks, solder joints, etc. The material properties are useful to calculate thermal properties. For example, the material properties could be chemical composition or a physical property such as thermal conductivity.

In step 304, a power profile is input for at least one element of the device. For illustrative purposes assume that process 300 is performed for a large power cycle. If the device being qualified is the example motherboard of FIG. 1, then a separate large power profile might be input for the CPU, the discrete electrical components, the power transformer, etc. If desired, power profiles can be input for solder joints.

In step 306, temperature information is input. For example, a value for ambient temperature of the device's expected environment is input. The ambient temperature might be a constant value. For example, the device might be expected to be used in a room for which temperature is carefully controlled. Alternatively, the ambient temperature can be time varying.

In step 308, a temperature profile is determined for each power profile. For example, a temperature profile can be created for the CPU, the power transformer, the discrete electrical components, etc. Tools are commercially available to automatically generate a temperature profile, based on a power profile. The model of the device and the ambient temperature may also be factored into the generation of the temperature map. The Multiphysics tool provided by ANSYS of Canonsburg, Pa. can be used to generate the temperature profile based on power profiles. The Flowtherm tool provided by Flowmerics of Surrey, United Kingdom can also be used to automatically generate the temperature profile for the power profile of each element.

In step 310, a temperature map for the device is generated, based on the individual temperature profiles. The temperature map is based on the temperature profiles from step 308, the ambient temperature, and the device model. For example, the heat sourced or sunk by the CPU, power transformer, discrete electrical components, heat sink, solder joints, etc. is considered, along with the device layout, and ambient temperature to determine a temperature map for the device. The temperature profile for each ETT may be derived from the temperature map. Note that because the power profile is for a certain time period, the temperature map generated therefrom may describe how the temperature changes over time. The temperature map allows a determination of a temperature profile at each of the ETTs.

The tool that determines the individual temperature profiles can also determine the temperature map. For example, the Multiphysics tool provided by ANSYS of Canonsburg, Pennnsylvania or the Flowtherm tool provided by Flowmerics of Surrey, United Kingdom can also be used to automatically generate the temperature map.

In step 312, a value for damage per cycle is determined for each ETT. As previously discussed, the model of the device contains information that describes properties of the solder joints. The damage to the solder joint per cycle can be determined from these properties and the temperature profile at the solder joint. For example, the damage may be due, at least in part, to differences in expansion rates between the solder and adjoining material. The damage per cycle for a particular ETT can be determined by inputting the temperature profile for the particular ETT, along with relevant physical description, into a tool such as the Multiphysics tool provided by ANSYS or the Flowtherm tool provided by Flowmerics.

Determining the Accelerated Test

After the damage per cycle is determined for each ETT for large and small cycles, the number of equivalent accelerated test cycles is determined in accordance with Equation 1, which is reprinted here:

$$D_{large\_cycle} * N_{large\_cycle} + D_{small\_cycle} * N_{small\_cycle} = D_{accelerated\_cycle} * N_{accelerated\_cycle}$$ Eq. 1:

As previously discussed, the number of large cycles and small cycles represent the number of cycles that the element should be able to withstand based on its expected use over some period of time. The damage per large cycle times the number of large cycles is the estimated damage attributable to large damage-cycles. The damage per small cycle times the number of small cycles is the estimated damage attributable to small damage-cycles. The sum of the estimated damage attributable to large damage-cycles and the estimated damage attributable to small damage-cycles gives the estimated damage that an element of a device would suffer if the device were operated under a set of specified conditions over a certain period of time.

To determine $N_{accelerated\_cycle}$, the damage for each accelerated cycle is determined, in one embodiment. The damage can be determined by first developing a characteristic of the accelerated test cycle. The accelerated test cycle can have any suitable format. For example, if the accelerated test cycle is an accelerated temperature cycle, then suitable values for low temperature, high temperature, ramp times, and dwell times are used.

Based on the characteristics of the accelerated temperature cycle and information regarding the ETT, the damage per accelerated cycle is determined. For example, if the ETT is a solder joint, the relevant information may include the composition of the solder and materials to which the solder is fixed, as well as size and shape of the solder joint. This ETT information and the accelerated temperature cycle characteristics can be input into a tool such as the Multiphysics tool provided by ANSYS of Canonsburg, Pa. or the Flowtherm tool provided by Flowmerics of Surrey, United Kingdom to automatically generate the damage per accelerated temperature cycle for the ETT.

To properly test the device, a suitable number of accelerated test cycles is determined for more than one ETT. To cover the worst case, the device should be tested based on the ETT with the highest number of test cycles.

Extensions and Alternatives

An example has been provided herein in which a solder joint is used as an example of an element for which an estimate can be made of the damage the element would suffer given specified use of the device of which the element is a part. However, solder joints are used as an illustration. More generally, the element to be tested can be any element for which an estimate can be made of the lifetime damage to the element due to specified conditions, and for which an accelerated test that will cause approximately an equivalent amount of damage can be determined. For example, an accelerated test for adhesives is determined, in one embodiment.

Hardware Overview

Figure 4:
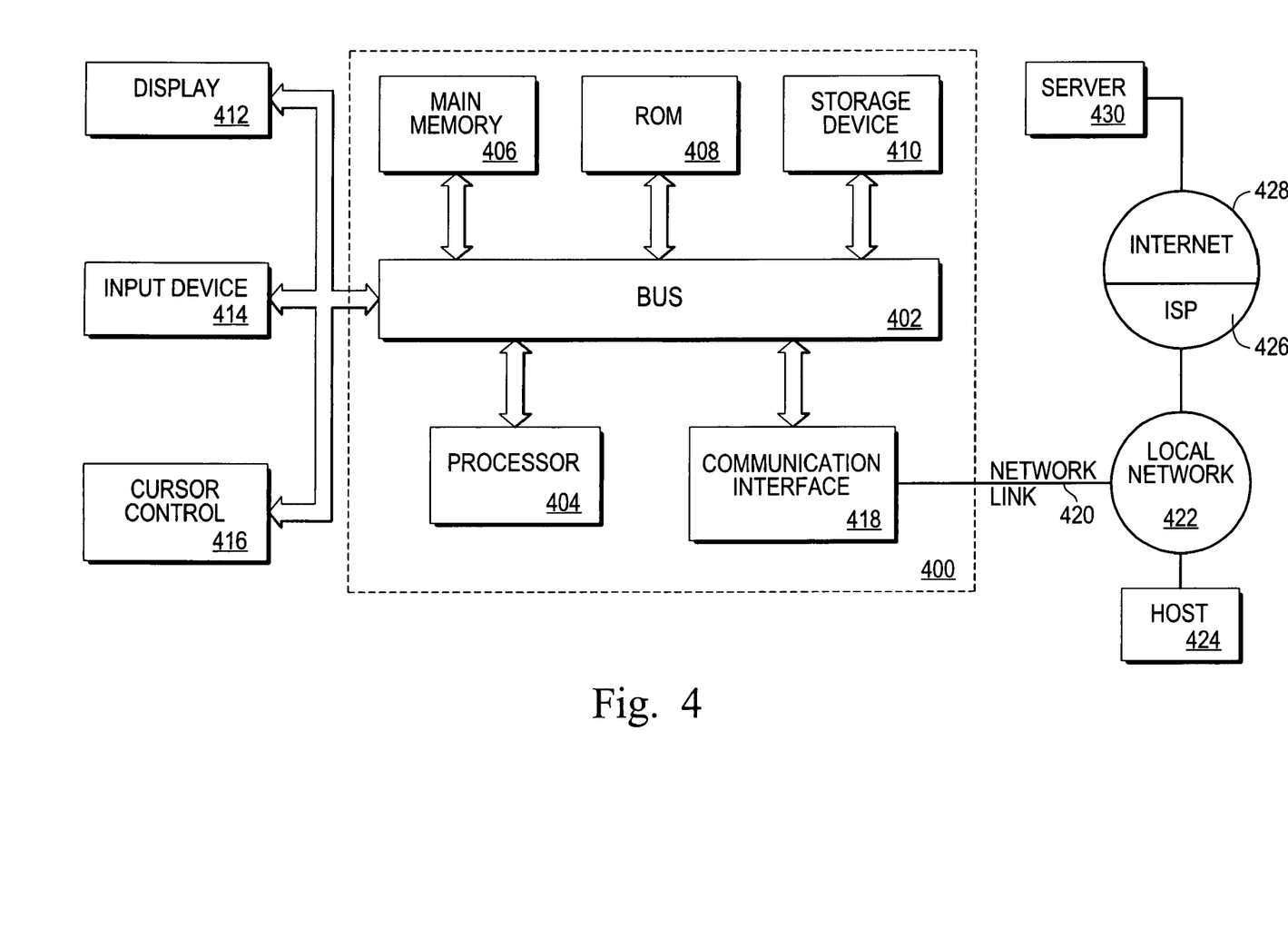
FIG. 4 is a block diagram of a general-purpose computer system in which one embodiment of the present invention may be implemented.

In one embodiment, steps of process 300 take the form of sets of instructions, which are executed on a processor. FIG. 4 shows a block diagram of a computer system 400 upon which these sets of instructions may be executed. Computer system 400 includes a bus 402 for facilitating information exchange, and one or more processors 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions by processor 404. Computer system 400 may further include a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412 for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

In computer system 400, bus 402 may be any mechanism and/or medium that enables information, signals, data, etc., to be exchanged between the various components. For example, bus 402 may be a set of conductors that carries electrical signals. Bus 402 may also be a wireless medium (e.g. air) that carries wireless signals between one or more of the components. Bus 402 may further be a network connection that connects one or more of the components. Any mechanism and/or medium that enables information, signals, data, etc., to be exchanged between the various components may be used as bus 402.

Bus 402 may also be a combination of these mechanisms/media. For example, processor 404 may communicate with storage device 410 wirelessly. In such a case, the bus 402, from the standpoint of processor 404 and storage device 410, would be a wireless medium, such as air. Further, processor 404 may communicate with ROM 408 capacitively. Further, processor 404 may communicate with main memory 406 via a network connection. In this case, the bus 402 would be the network connection. Further, processor 404 may communicate with display 412 via a set of conductors. In this instance, the bus 402 would be the set of conductors. Thus, depending upon how the various components communicate with each other, bus 402 may take on different forms. Bus 402, as shown in FIG. 4, functionally represents all of the mechanisms and/or media that enable information, signals, data, etc., to be exchanged between the various components.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, DVD, or any other optical storage medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the issued claims and the equivalents thereof.

What is claimed is:

1. A machine implemented method using a microprocessor, comprising:
    calculating an estimated amount of damage that an element of a device would suffer if the device were operated under a set of specified conditions over a certain period of time,
    wherein calculating an estimated amount of damage comprises:
        calculating a first damage amount attributable to large damage-cycles;
        calculating a second damage amount attributable to small damage-cycles;
        summing the first and second damage amounts to derive the estimated damage amount; and
    determining an accelerated test to which to subject the element in order to cause the element to suffer an actual amount of damage that is approximately equal to the estimated amount of damage,
    wherein calculating the first damage amount comprises:
        estimating how much damage is caused by each large damage-cycle; and
        accessing a value describing how many large damage-cycles will be experienced by the element.

2. The method as recited in claim 1, further comprising:
    simulating operation of the device to generate one or more power profiles for the device; and
    wherein calculating an estimated amount of damage comprises:
        estimating the amount of damage based upon the one or more power profiles for the device.

3. The method of claim 2, wherein the one or more power profiles comprise a large cycle power profile and one or more small cycle power profiles for a particular part of the device.

4. The method of claim 3, wherein the one or more power profiles comprise a large cycle power profile and one or more small cycle power profiles for each of a plurality of parts of the device.

5. The method of claim 1, wherein determining the accelerated test comprises determining a number of accelerated test cycles to which to subject the element in order to cause the element to suffer an actual amount of damage that is approximately equal to the estimated amount of damage.

6. The method of claim 5, wherein determining the number of accelerated test cycles comprises:
    determining an amount of actual damage that will be caused by each accelerated test cycle; and
    dividing the estimated amount of damage by the amount of actual damage caused by each accelerated test cycle to derive the number of accelerated test cycles.

7. The method as recited in claim 1, further comprising:
    for at least one additional element of the device:
    calculating an estimated amount of damage that the additional element of the device would suffer if the device were operated under the set of specified conditions over the certain period of time; and
    determining an accelerated test for the additional element in order to cause the additional element to suffer an actual amount of damage that is approximately equal to the estimated amount of damage.

8. The method as recited in claim 7, wherein determining the accelerated test comprises selecting the accelerating test that is the most stringent.

9. The method of claim 1, wherein calculating the second damage amount comprises:
    estimating how much damage is caused by each small damage-cycle; and
    accessing a value describing how many small damage-cycles will be experienced by the element.

10. A machine readable medium having stored thereon a set of instructions which, when executed by one or more processors, causes the one or more processors to perform the following operations:
    calculate an estimated amount of damage that an element of a device would suffer if the device were operated under a set of specified conditions over a certain period of time, comprising
        calculate a first damage amount attributable to large damage-cycles;
        calculate a second damage amount attributable to small damage-cycles; and
        sum the first and second damage amounts to derive the estimated damage amount; and
    determine an accelerated test to which to subject the element in order to cause the element to suffer an actual amount of damage that is approximately equal to the estimated amount of damage,
    wherein the instructions, which when executed by one or more processors, causes the one or more processors to perform the operation calculate the first damage amount, further comprise instructions which, when executed by the one or more processors, cause the one or more processors to perform the following operations:
        estimate how much damage is caused by each large damage-cycle; and access a value describing how many large damage-cycles will be experienced by the element.

11. The machine readable storage medium as recited in claim 10, wherein the set of instructions further comprise instructions that when executed by the one or more processors, cause the one or more processors to perform the following operation:

simulate operation of the device to generate one or more power profiles for the device; and wherein the instructions, which when executed by one or more processors, causes the one or more processors to perform the operation calculate an estimated amount of damage, further comprise instructions which, when executed by the one or more processors, cause the one or more processors to perform the following operation:

estimate the amount of damage based upon one or more power profiles for the device.

12. The machine readable storage medium of claim 11, wherein the one or more power profiles comprise a large cycle power profile and one or more small cycle power profiles for a particular part of the device.

13. The machine readable storage medium of claim 12, wherein the one or more power profiles comprise a large cycle power profile and one or more small cycle power profiles for each of a plurality of parts of the device.

14. The machine readable storage medium of claim 10, wherein the instructions, which when executed by one or more processors, causes the one or more processors to perform the operation determine the accelerated test, further comprise instructions which, when executed by the one or more processors, cause the one or more processors to perform the following operation:

determine a number of accelerated test cycles to which to subject the element in order to cause the element to suffer an actual amount of damage that is approximately equal to the estimated amount of damage.

15. The machine readable storage medium of claim 14, wherein the instructions, which when executed by one or more processors, causes the one or more processors to perform the operation determine the number of accelerated test cycles, further comprise instructions which, when executed by the one or more processors, cause the one or more processors to perform the following operations:

determine an amount of actual damage that will be caused by each accelerated test cycle; and divide the estimated amount of damage by the amount of actual damage caused by each accelerated test cycle to derive the number of accelerated test cycles.

16. The machine readable storage medium as recited in claim 10, wherein the set of instructions further comprise instructions that when executed by the one or more processors, cause the one or more processors to perform the following operations:

for at least one additional element of the device:

calculate an estimated amount of damage that the additional element of the device would suffer if the device were operated under the set of specified conditions over the certain period of time; and determine an accelerated test for the additional element in order to cause the additional element to suffer an actual amount of damage that is approximately equal to the estimated amount of damage.

17. The machine readable storage medium as recited in claim 16, wherein the instructions, which when executed by one or more processors, causes the one or more processors to perform the operation determine the number of accelerated test cycles, further comprise instructions which, when executed by the one or more processors, cause the one or more processors to perform the following operation:

select the accelerating test that is the most stringent.

18. The machine readable storage medium of claim 10, wherein the instructions, which when executed by one or more processors, causes the one or more processors to perform the operation calculate the second damage amount, further comprise instructions which, when executed by the one or more processors, cause the one or more processors to perform the following operations:

estimate how much damage is caused by each small damage-cycle; and access a value describing how many small damage-cycles will be experienced by the element.

* * * * *